(12) United States Patent
Schumacher et al.

(10) Patent No.: US 6,318,671 B1
(45) Date of Patent: Nov. 20, 2001

(54) VARIABLE POSITION AND MODULAR LUGGAGE STORAGE SYSTEM FOR AN AIRCRAFT PASSENGER CABIN

(75) Inventors: Markus Schumacher, Buxtehude; Andrew Muin, Harsefeld; Lutz Franke, Hamburg, all of (DE)

(73) Assignee: DaimlerChrysler Aerospace Airbus GmbH, Hamburg (DE)

( * ) Notice: Subject to any disclaimer, the term of this patent is extended or adjusted under 35 U.S.C. 154(b) by 0 days.

(21) Appl. No.: 09/388,134

(22) Filed: Sep. 1, 1999

(30) Foreign Application Priority Data

Sep. 1, 1998 (DE) ............................. 198 39 701

(51) Int. Cl.⁷ .................................................. B64D 11/00
(52) U.S. Cl. .......................................................... 244/118.5
(58) Field of Search ........................... 248/246; 312/245, 312/198, 247, 270.1, 272; 244/118.5, 130, 119

(56) References Cited

U.S. PATENT DOCUMENTS

| | | | |
|---|---|---|---|
| 3,025,122 | * | 3/1962 | Millman . |
| 3,948,581 | * | 4/1976 | Helman et al. . |
| 5,108,048 | * | 4/1992 | Chang . |
| 5,222,611 | * | 6/1993 | Wood et al. . |
| 5,244,269 | | 9/1993 | Harriehausen et al. . |
| 5,395,074 | * | 3/1995 | Hart et al. . |
| 5,422,794 | * | 6/1995 | Drake . |
| 5,551,980 | * | 9/1996 | Turnbo . |
| 5,651,733 | | 7/1997 | Schumacher . |
| 5,687,929 | * | 11/1997 | Hart et al. . |
| 5,716,027 | * | 2/1998 | Hart et al. . |
| 5,820,076 | | 10/1998 | Schumaher et al. . |
| 5,938,149 | * | 8/1999 | Terwesten . |
| 6,045,204 | * | 4/2000 | Frazier et al. . |

* cited by examiner

*Primary Examiner*—Charles T. Jordan
*Assistant Examiner*—Tien Dinh
(74) *Attorney, Agent, or Firm*—W. F. Fasse; W. G. Fasse

(57) ABSTRACT

Luggage storing bins in an aircraft passenger cabin are suspended from rigid mounting brackets by cooperating first and second securing elements forming part of the carriers and of bin end walls. The securing elements, such as holes, cooperate with connector members such as threaded bolts and nuts, whereby the bins can be secured to the respective bracket in different elevational positions to vary a cabin layout in accordance with airline requirements. Gaps between the cabin ceiling cover panels and the bins are covered by overlaps and/or additional moldings to accommodate different elevational bin positions.

15 Claims, 9 Drawing Sheets

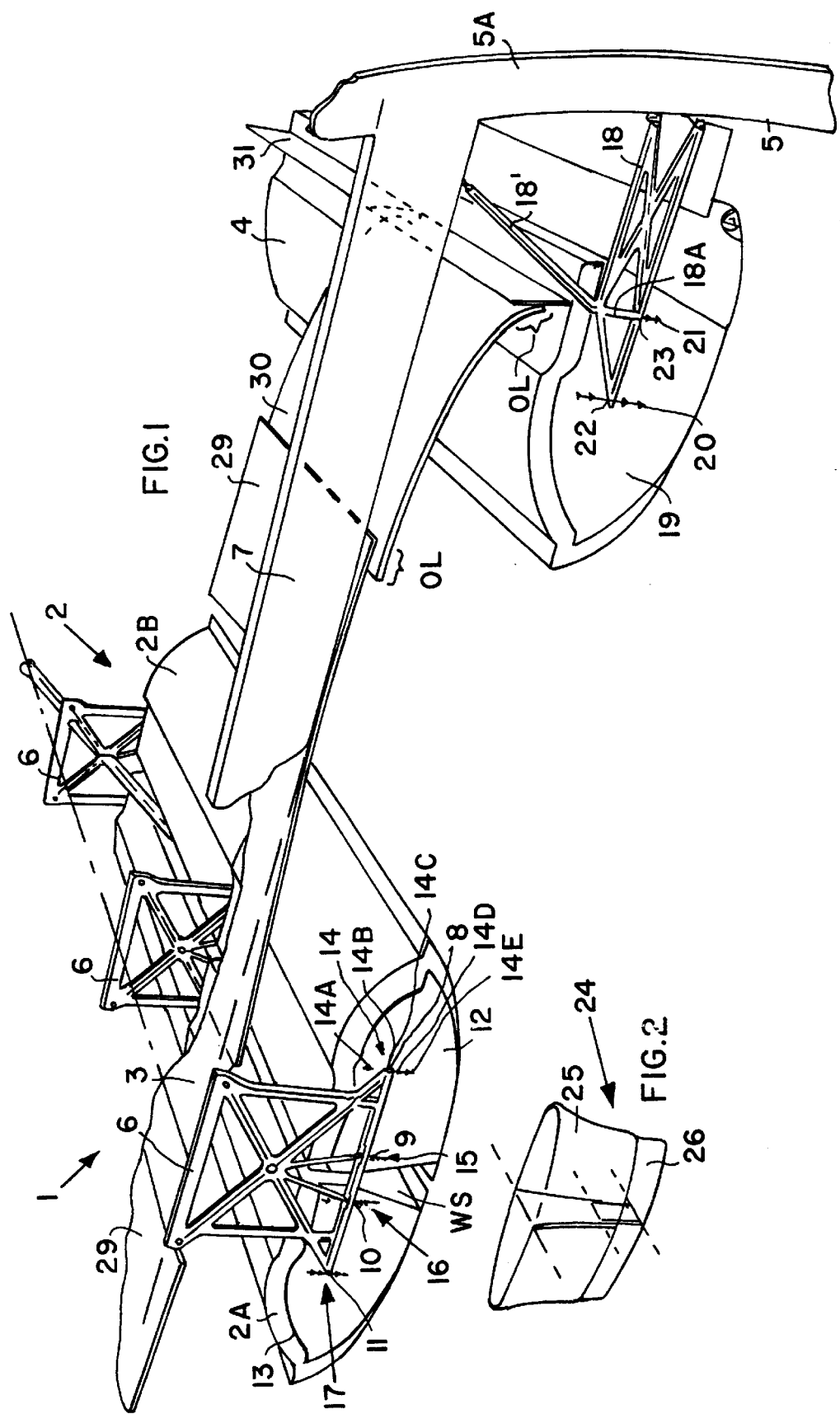

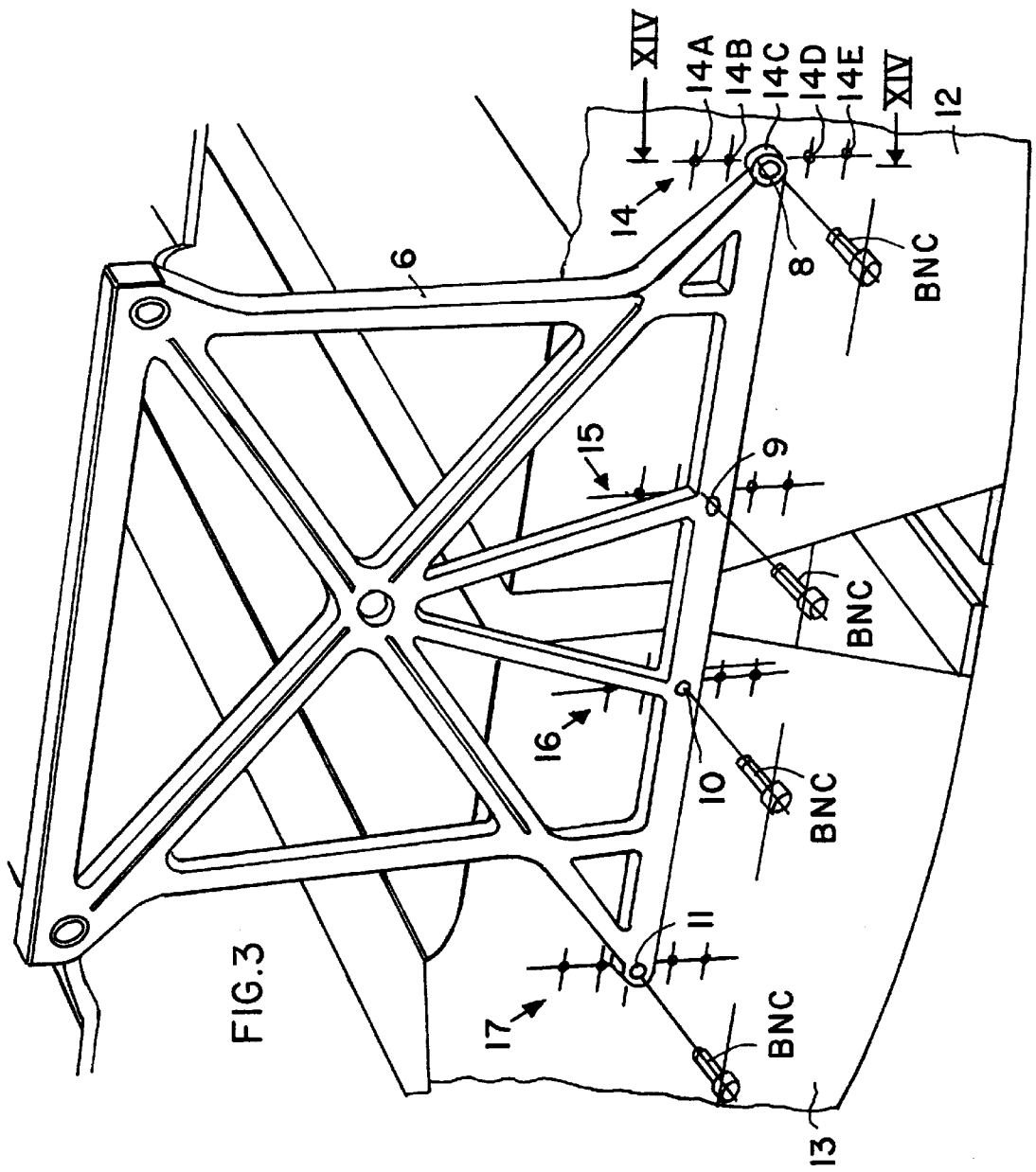

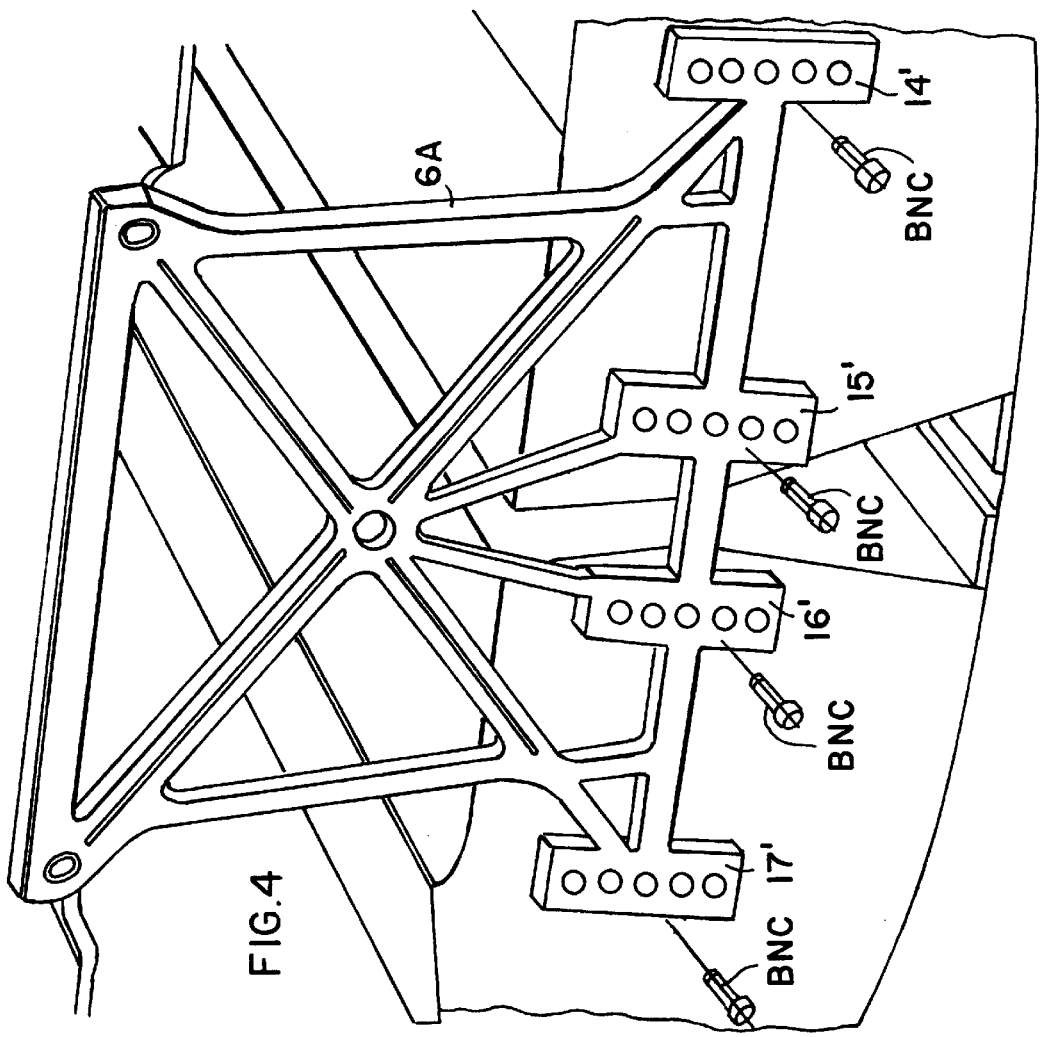

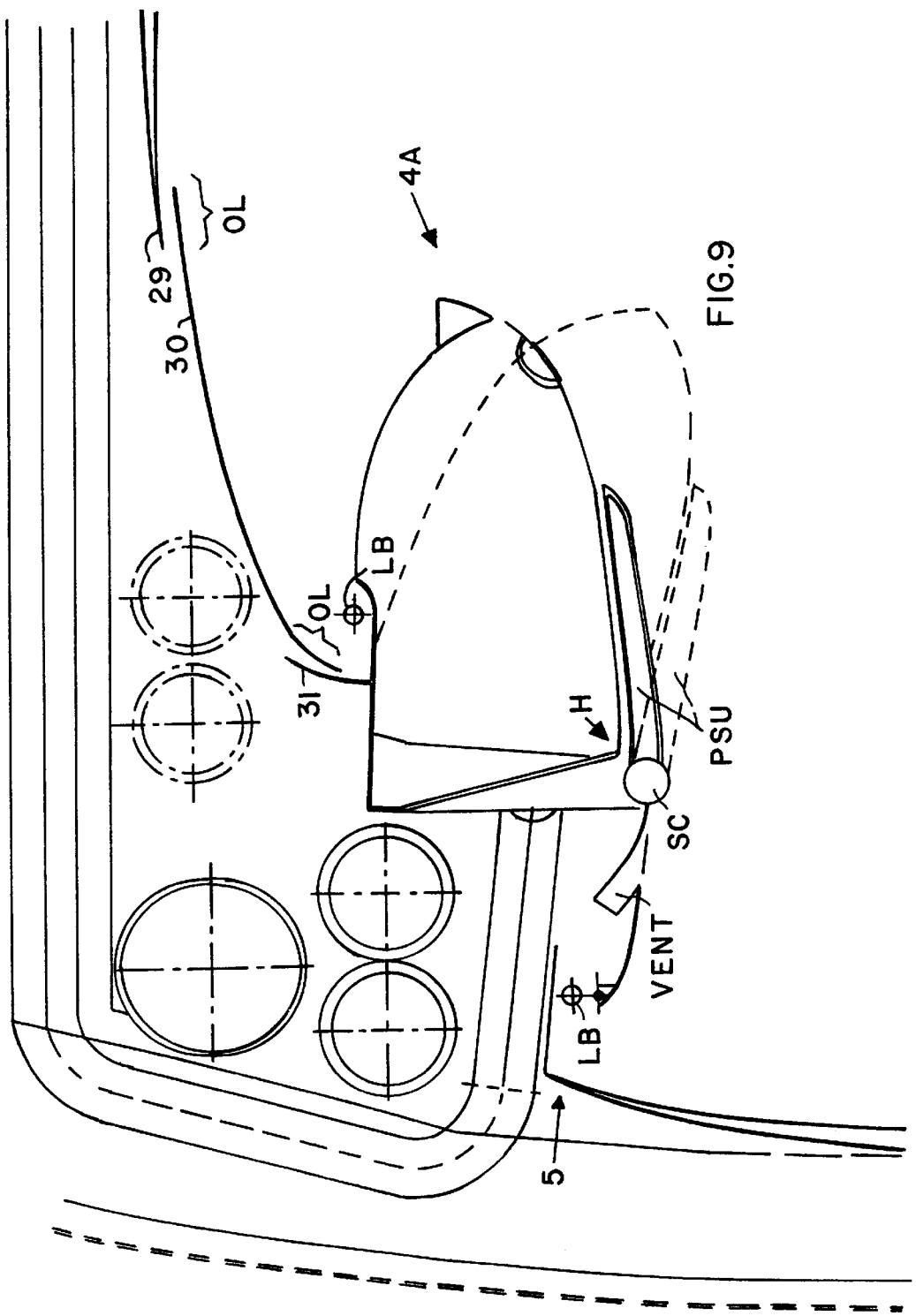

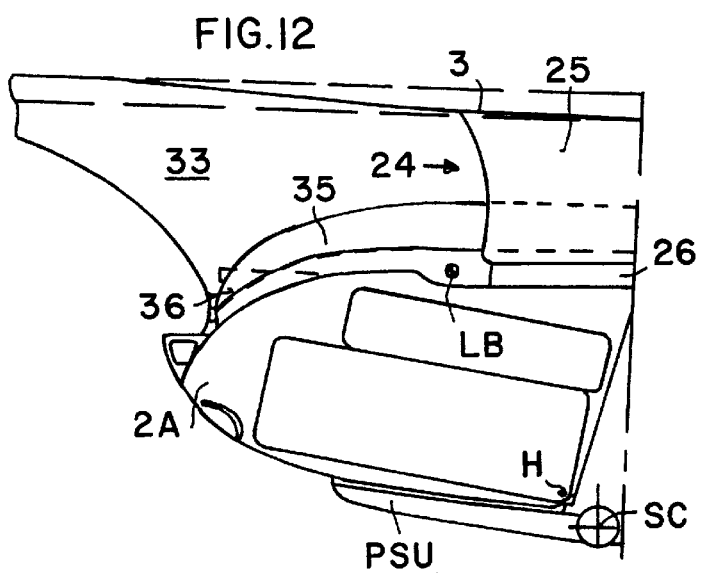
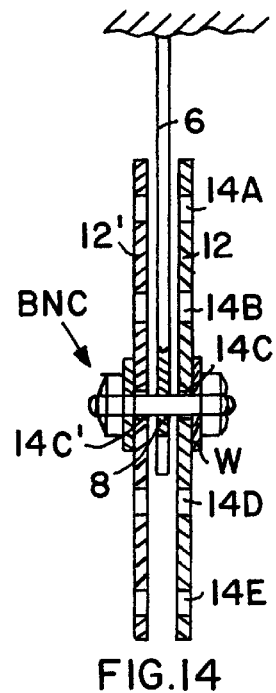
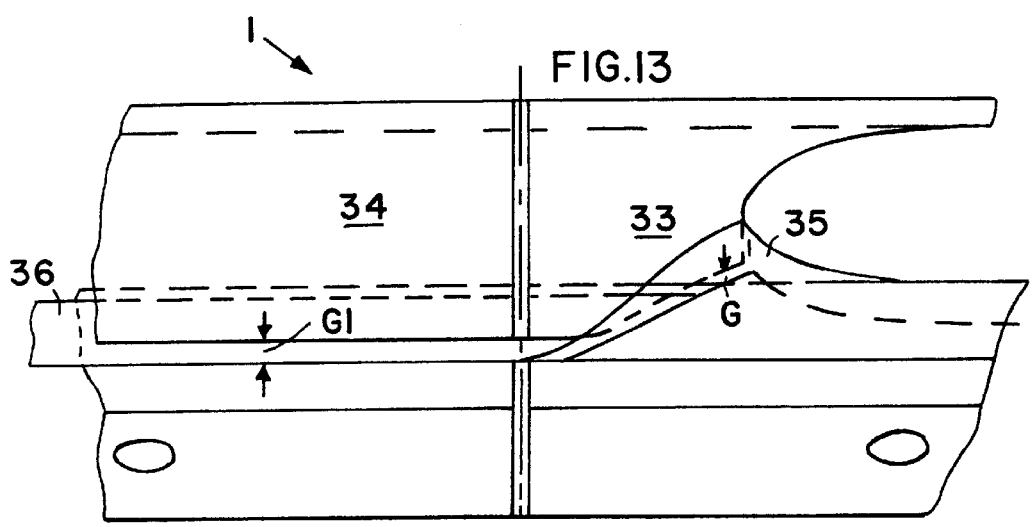

VARIABLE POSITION AND MODULAR LUGGAGE STORAGE SYSTEM FOR AN AIRCRAFT PASSENGER CABIN

PRIORITY CLAIM

This application is based on and claims the priority under 35 U.S.C. §119 of German Patent Application 198 39 701.1, filed in Germany on Sep. 1, 1998, the entire disclosure of which is incorporated herein by reference.

FIELD OF THE INVENTION

The invention relates to a luggage storage system for an aircraft passenger cabin. Such a system includes centrally arranged luggage compartments suspended by central mounting brackets secured to the ceiling structure centrally in the aircraft and in the longitudinal direction of the aircraft body. The system further includes lateral luggage compartments arranged along the longitudinal cabin walls and suspended by lateral mounting brackets.

BACKGROUND INFORMATION

It is customary to store carry-on luggage in so-called overhead storage bins or compartments above the rows of seats in an aircraft passenger cabin. Several rows of overhead storage bins or compartments may be mounted above the passenger seats along the center of the ceiling structure and along the corners between the ceiling and the side walls of the cabin. All bins are accessible from an aisle. Conventional storage systems leave room for improvement with regard to the accessibility of individual storage bins. The term bin or bins is used herein interchangeably with the term compartment or compartments, respectively.

U.S. Pat. No. 5,244,269 (Harriehausen et al.) discloses overhead luggage compartments, each of which is equipped with a trough that can be lowered from a closed position to an open position of the individual trough or raised from an open position to a closed position. Such a feature makes it easier for a passenger to reach into a bin independently of the fact whether a passenger is tall or short. However, providing each individual storage bin with a mechanism for raising and lowering the trough in the bin requires a substantial effort and expense. Yet, the use of such facilities may be desirable for certain owners or airlines which may want to order a custom made aircraft.

U.S. Pat. No. 5,820,076 (Schumacher et al.) discloses a luggage compartment system for a passenger cabin, especially in commercial airliners. The system comprises compartment units each formed by at least two compartments interconnected or coupled through a coupling, guide and drive mechanism for moving the compartments of a unit from a closed upper position to an open lower position and vice versa. Each unit has a large compartment and a small compartment, the latter is intended for smaller luggage items, including fragile items, while the larger compartment is intended for large luggage including suitcases. In the closed position the two compartments of a unit are arranged next to each other in a direction extending crosswise to a longitudinal central vertical plane through the aircraft cabin. The compartments have contoured bottom panels that are integrated into the ceiling of the cabin in the closed compartment position. The coupling, guide and drive mechanism moves both compartments of a unit either up or down, whereby the compartments in their down position are located just above the passenger seats for loading and unloading with the smaller compartment being positioned above the larger compartment. openings in the compartments face the central longitudinal plane, that is, the respective aisle.

U.S. Pat. No. 5,651,733 (Schumacher) discloses passenger service units in a passenger cabin, especially of an aircraft. These units include a service module having comfort and service elements such as reading lamps, flight attendant call buttons, loudspeakers, air nozzles, and the like. The service module is mounted on a spring-biased yielding support arm below the bottom shell of an overhead luggage compartment. An end of the support arm is mounted on the cabin wall and extends generally inwardly toward the middle of the cabin, to position the service module generally centrally above the passenger seats that are to be served by the service module. Connector lines such as electrical conductors and air conduits run along the support arm to connect the service module to a service channel extending along the length of the passenger cabin and including electrical conductors, an air duct, and the like. When the bottom shell of the overhead baggage compartment is lowered to open the baggage compartment, the service module yields downward on the spring-biased support arm while remaining fully functional and reachable by the corresponding passengers at all times, and without hindering the opening of the baggage compartment.

While the raising and lowering or tilting features of the troughs in fixed bins greatly improve the accessibility to the troughs, there are limits in the elevational range in which the troughs can be positioned.

OBJECTS OF THE INVENTION

In view of the foregoing it is the aim of the invention to achieve the following objects singly or in combination:

to provide a luggage storage system for an aircraft passenger cabin which can be mounted and remounted at different elevational positions without sacrificing the advantages of the above described system with regard to providing easy access to each individual bin or its trough with due regard to passengers of all sizes;

to construct the luggage storage system in such a way that the same system can easily be retooled or repositioned at different elevational levels in the same aircraft type in accordance with individual airline or customer requirements; and to construct the ceiling paneling in such a way that the different elevational positions of the luggage storage compartments can be accommodated by covering gaps between repositioned compartment and ceiling panels in any different elevational position of these compartments.

SUMMARY OF THE INVENTION

According to the invention a luggage storage system in an aircraft includes luggage compartments that are central and/or lateral luggage compartments which are mounted to the ceiling structure by carrier or suspension brackets which permit securing the individual luggage compartments at different elevational positions. The storage bins and the brackets are equipped with mounting or securing elements which cooperate with each other and with connector members at different selectable elevational levels. The carrier or suspension brackets and/or the end walls of the individual compartments are provided with holes forming the mounting or securing elements. The holes are arranged in vertical columns and horizontal rows and pairs of holes are selectable in such a way that all compartments of the system can assume the same elevational level for a horizontal alignment of all compartments or so that different horizontal levels may be achieved in different cabin sections or even for individual compartments.

Such a construction has the advantage that with cost efficient efforts the luggage compartment system in an aircraft cabin may be retooled in accordance with requirements of individual airlines or customers. Moreover, the ceiling panels that cover the ceiling structure are so constructed that a spacious cabin impression is retained even if the rows of luggage bins are in a lowered position.

The choice of various elevational positions for luggage storage compartment of different types and sizes further improves the variability of the cabin layout configuration leaving the layout selection to the aircraft owner. Another advantage of the present system is seen in that it can be equipped with tiltable compartment troughs, with troughs that are equipped with individual lowering and raising mechanisms or with fixed bins, and with compartments of different sizes.

BRIEF DESCRIPTION OF THE DRAWINGS

In order that the invention may be clearly understood it will now be described in connection with example embodiments, with reference to the accompanying drawings, wherein:

FIG. 1 is a perspective broken away view of a luggage storage system according to the invention illustrating twin central storage compartments and a lateral compartment on the right side of the cabin as viewed in the longitudinal aircraft axis with the viewer facing toward the tail of the aircraft;

FIG. 2 illustrates a telescoping collar for covering individual central mounting brackets for the twin central storage compartments;

FIG. 3 shows on an enlarged scale compared to FIG. 1, a central mounting bracket with four holes and compartment suspension walls each provided, for example, with two columns of five mounting holes in each column;

FIG. 4 is a view similar to that of FIG. 3, but showing a modified central mounting bracket provided with four columns of five mounting holes each, and compartment suspension walls with two mounting holes each arranged in a horizontal row;

FIG. 9 shows an end view of a left-hand lateral compartment with a tiltable trough and a flexibly mounted passenger service unit;

FIG. 12 is a view in the direction of the longitudinal axis of the aircraft facing toward the tail, showing position adjustable ceiling panels above a central left-hand twin compartment section;

FIG. 13 is a view against position adjustable ceiling panels in a direction crosswise to the longitudinal aircraft axis; and FIG. 14 is a broken away sectional view substantially along section line XIV—XIV in FIG. 3, however showing one compartment suspension wall on each side of the mounting bracket rather than only one such wall shown in FIG. 3.

Figure 5:
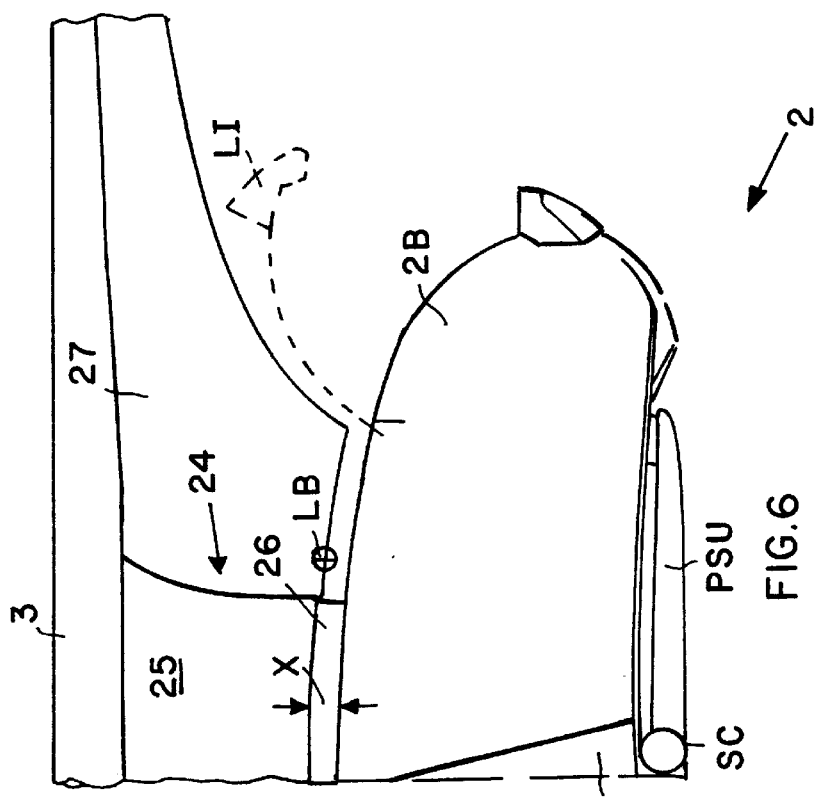
FIG. 5 shows an end view of a tiltable luggage trough in an elevationally adjustable compartment section of a central twin compartment in its uppermost position.

DETAILED DESCRIPTION OF PREFERRED EXAMPLE EMBODIMENTS AND OF THE BEST MODE OF THE INVENTION

FIG. 1 shows a broken away perspective view of a portion of a passenger aircraft cabin 1 illustrating the positioning of twin central luggage storing compartments 2 supported or suspended by a ceiling structure 3 and central mounting brackets 6. A right-hand lateral luggage compartment 4 is suspended by a lateral mounting bracket 18, 18' secured to the frame structure of the aircraft body including lateral ribs 5A and cross beams 7 for carrying the ceiling structure 3. Cabin wall 5 covers the ribs.

The twin central compartments 2 comprise two back-to-back compartment sections 2A, 2B suspended from several rigid central mounting brackets 6 which in turn are rigidly secured at their upper ends to respective ceiling cross beams 7. Only one cross beam 7 is shown to simplify the illustration. The downwardly facing end of the mounting brackets 6 is provided with connector elements 8, 9, 10 and 11 such as four holes positioned in at least one horizontal row, so that two holes are provided for compartment section 2A and two holes are provided for compartment section 2B. Thus, the holes 8, 9 are used for the right-hand bin section 2B and the holes 10 and 11 are used for the left-hand bin section 2A. The rigid mounting brackets 6 are preferably so constructed that between ceiling panels and the top surface of the bins there is sufficient space for the elevational position adjustment of the bins 2. A wedge shaped space WS is provided between the back sides of the bins. This space may be used for components of passenger service units as will be described below.

Each compartment 2A, 2B has mounting end walls 12, 13 for suspending the respective compartment in selectable elevational positions. For this purpose each mounting end wall is provided with further connector elements in the form of vertical columns 14, 15, 16 and 17 of holes which cooperate with the holes 8, 9, 10 and 11 in the central brackets 6 for providing a bin suspending connection between each end wall 12, 13 and the respective mounting bracket 6 when a threaded bolt and nut connector BNC passes through two or three holes as will be described in more detail below with reference to FIG. 14. Each column of holes comprises a number of holes, for example five such holes 14A, 14B, 14C, 14D and 14E are shown in FIGS. 1 and 3 in the vertical column 14. The number of vertical hole columns will correspond to the number of holes 8, 9, 10, 11 in the central bracket 6. The columns of holes can be provided in the bin end walls 12, 13 as shown in FIG. 3 or the hole columns can be provided in modified mounting brackets 6A shown in FIG. 4.

Figure 6:
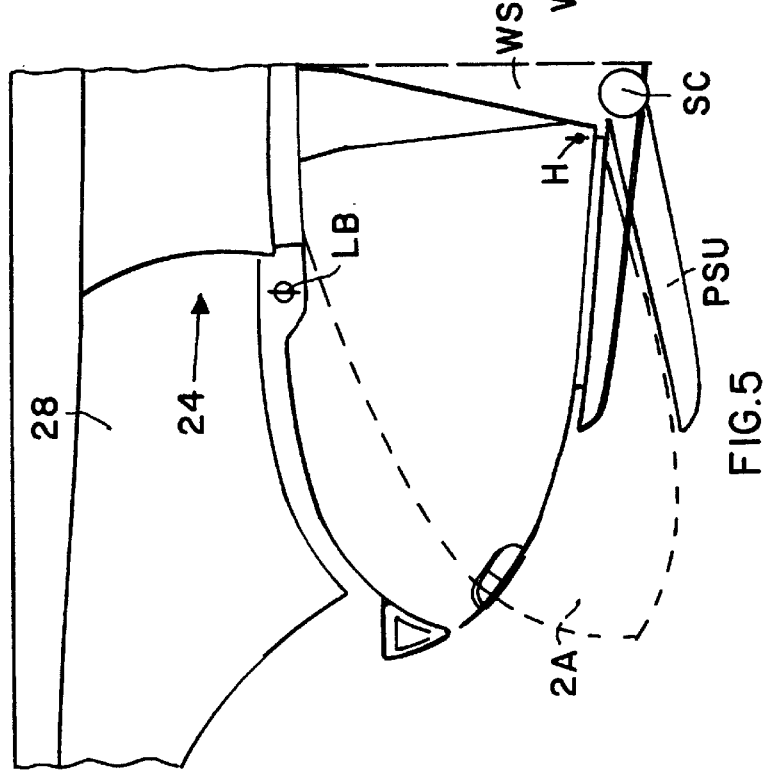
FIG. 6 is a view similar to that of FIG. 5, however illustrating a fixed central luggage trough with a lid in a central twin compartment section also in its uppermost position.
Figure 8:
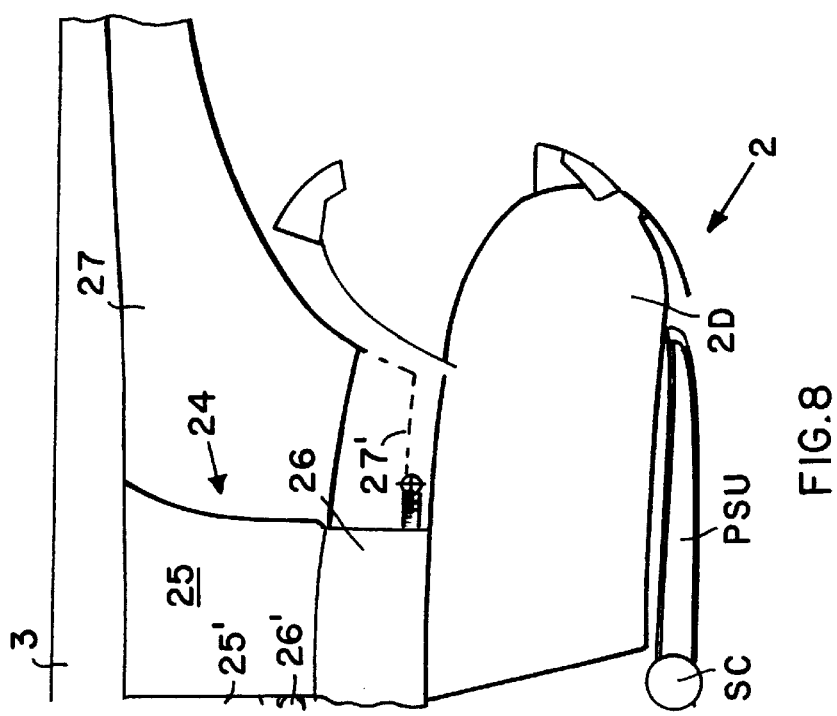
FIG. 8 is a view similar to FIG. 6 with a smaller fixed central lidded trough, but with the respective compartment section in its lowermost position.
Figure 7:
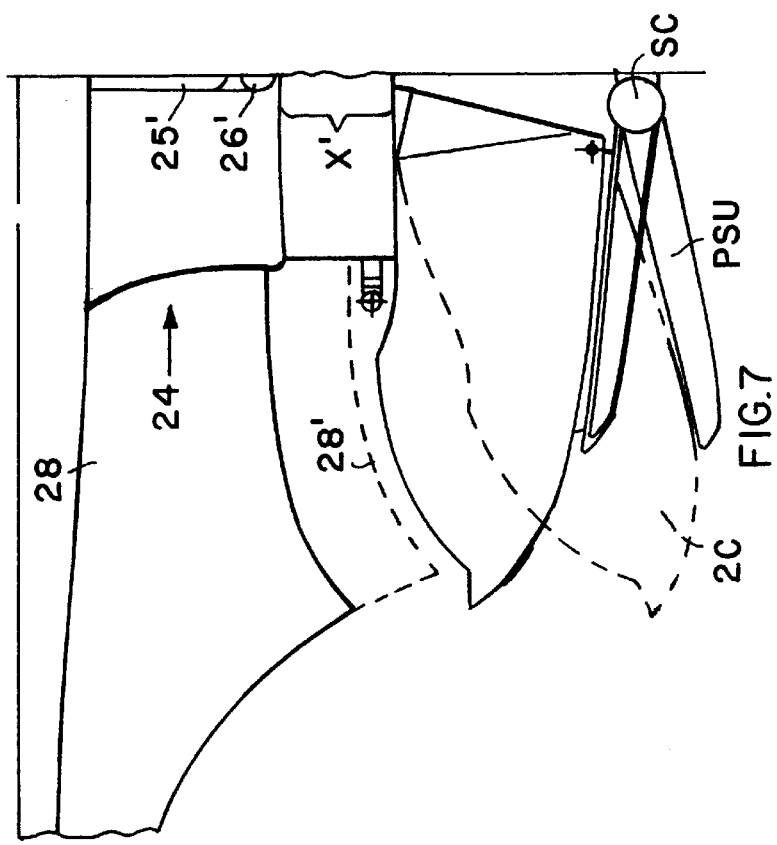
FIG. 7 is a view similar to that of FIG. 5 with a tiltable smaller trough, however with the twin central luggage compartment section in a lowermost position.

With the help of these vertical columns of holes 14, 15, 16, 17 in FIG. 3 or 14', 15', 16', 17' in FIG. 4, it is possible to secure the bins 2A, 2B to the brackets 6 or 6A in different elevational positions. Five holes, for example, provide for five different elevational positions. The on-center spacings between the holes correspond to the adjustment steps that can be selected. The same bolt and nut connectors BNC are used for fixing the bins in any of the five possible elevational bin positions. Moreover, the individual bins may have a modular construction so that any bin may fit between any two neighboring suspension or mounting brackets 6, 6A. Due to the adjustable elevation, it is possible to install smaller or larger storage bins. FIGS. 5 and 6 show larger bins 2A, 2B, whereby the spacing X between the top of the bins 2A, 2B and a bottom edge of a cover collar 25 is relatively small. FIGS. 7 and 8 show smaller bins 2C, 2D with a respectively larger spacing X. Such selection whether to use larger or smaller bins can be made by the purchaser of the aircraft and the implementation of the selection is possible without any large effort and expense in the tooling or retooling of a cabin layout.

Referring further to FIG. 1, lateral bins 4 are suspended from a cantilevered lateral mounting bracket 18, which may be reinforced by a rod or truss 18'. Preferably, the bracket 18 is secured to a rib 5A of the body frame and if desired also to the cross beam 7 by the rod or truss 18'. For better stability, each lateral bin 4 is provided in its end walls 19 with at least two vertical columns of holes 20 and 21 in the same manner as shown in FIG. 3 for bins 2A and 2B. Corresponding connector holes 22 and 23 are provided in the bracket 18 for cooperation with the rows of holes 20 and 21 and with a threaded bolt and nut connector BNC for suspending the respective bin 4 at a predetermined elevational position. Thus, the aircraft cabin layout may be retooled in accordance with airline requirements without a large effort and expense for the mounting or remounting of the bins 2 and/or 4. Different cabin sections may be equipped with storage bins suspended at different elevational levels to accommodate passenger preferences.

In order to compensate for different elevational bin positions in the ceiling cover panels it is necessary that the ceiling panels are constructed for cooperation with one another and with gap covering moldings in order to avoid the formation of visible gaps and openings when the bins are adjusted for a different elevational position. Such visible gaps and openings are avoided according to the invention by the present ceiling construction and cover construction for the mounting brackets 6, 6A, 18, 18' which will now be described.

FIG. 2 shows a cover 24 for the suspension or mounting brackets 6, 6A. Each cover 24 comprises an outer sleeve 25 and an inner collar 26 capable of telescoping up and down within the sleeve 25. Instead of a telescoping construction, a bellows type construction could be used for covering the suspension brackets 6, 6A.

Viewing FIGS. 5 and 6 in conjunction, the large bins 2A and 2B are shown in an uppermost position, whereby the collar 26 is substantially recessed in the sleeve 25, except for the above mentioned small spacing X that covers any gap between the top of the respective bin 2A or 2B and the lower end of the respective suspension bracket 6 which is enclosed by the sleeve 25. In FIGS. 7 and 8 the collar 26 projects downwardly by a larger spacing X showing that the smaller bins 2C and 2D are in a lowered position, not necessarily the lowermost position. In order to prevent relative rotation between the sleeve 25 and the collar 26, the latter may be provided with a guide pin 26' riding in a guide slot 25' of the sleeve 25. The guide pin 26' may be spring biased for pushing it out of the guide slot 25'. Thus, the suspension bracket 6 is completely enclosed by the cover 24 so that it is out of sight independently of the elevational bin position. The sleeve 25 is secured to the ceiling structure 3 as best seen in FIGS. 5 to 8. In order to harmonize the suspended bins 2A or 2C, 2D with the ceiling covering, ceiling panels 27 and 28 are arranged below the ceiling structure 3 and adjustably secured thereto in a telescoping manner. The ceiling panels 27 and 28 are contoured to the contours of the luggage bins 2A, 2B, 2C, 2D between neighboring suspension brackets 6, 6A and bracket coverings 24. In FIGS. 5 and 6 the panels 27 and 28 are shown by full lines in an up-position. In FIGS. 7 and 8 the full line position is also the up-position while the dashed line position is the down-position of the ceiling panels 27, 28. The down-position is effective, for example, when small bins 2C and 2D are used as shown in FIGS. 7 and 8.

In FIG. 5 the larger bin 2A can be lowered for access by tilting the bin about a hinge H into the dashed line position. A fluorescent light tube LB illuminates both the cabin and the open bin. The suspension end walls are not shown in FIGS. 5 to 8. A passenger service unit PSU is mounted to the bin. The PSU is sufficiently flexible to follow the bin into the downwardly tilted position. The PSU is electrically connected to a supply channel SC partly enclosed in the wedge space WS. The supply channel SC also provides a fresh air flow channel not shown, but connected to the PSU. The large bin 2B of FIG. 6 is fixed and cannot be tilted. Access is provided by a hinged lid LI. However, the elevational position of the tiltable bin 2A of FIG. 5 and of the fixed bin 2B in FIG. 6 is adjustable up or down as described above. The PSUs are capable to follow these adjustments. Further, the vertical trough lifting and trough lowering mechanism described in the above mentioned U.S. Pat. No. 5,244,269 can be combined with the present elevational positioning device instead of tilting.

If the luggage bins are adjusted in their elevational position by a retooling or when large bins are to be replaced by smaller bins or vice versa or if tiltable bins are to be replaced by fixed bins with doors, it is possible that additional cabin and ceiling wall panels or moldings are required in order to cover gaps that might occur because the different bin positions prevent a proper correlation between panels to avoid visible gaps in the ceiling paneling. According to the invention this problem has been solved by overlapping ceiling panels 29, 30 and by cover moldings 31 providing the required overlap OL along the panel edges as shown in FIG. 1.

A further possibility of covering gaps is shown in FIGS. 5 to 8, wherein the panels 27 and 28 are capable of telescoping up and down in order to accommodate a lowering or lifting of the luggage bins and for accommodating different types of bins having different outer dimensions and different constructions as described above.

Figure 10:
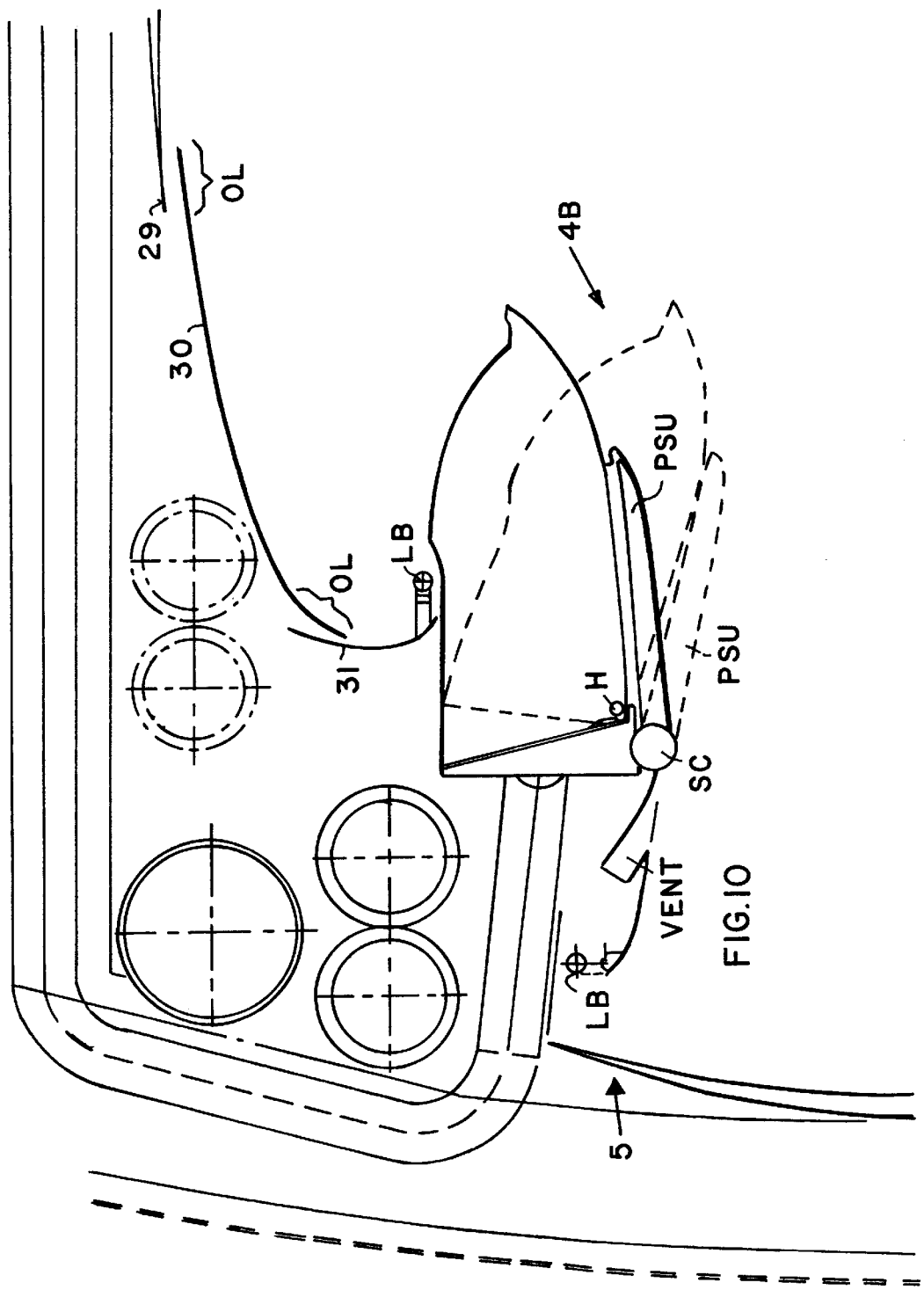
FIG. 10 is a view similar to that of FIG. 9, however, with a smaller tiltable trough.

FIGS. 9 and 10 show a left-hand lateral bin system on the left side of the viewer who faces in the longitudinal aircraft axis toward the tail section of the aircraft.

In both FIGS. 9 and 10 the bins 4A and 4B are tiltable around a hinge H and hence do not require any cover lids. The bin 4A in FIG. 9, is larger than the bin 4B in FIG. 10. Ceiling panels 29 and 30 are constructed to overlap each other at OL. Further, a cover molding 31 is secured to the ceiling and provides a further overlap OL with the panel 30 to cover any gaps that may occur when the bins 4A, 4B are repositioned to a different elevational level. Thus, depending on the elevational position of the respective bin, the overlaps OL will be larger or smaller, but gaps will always be covered.

Figure 11:
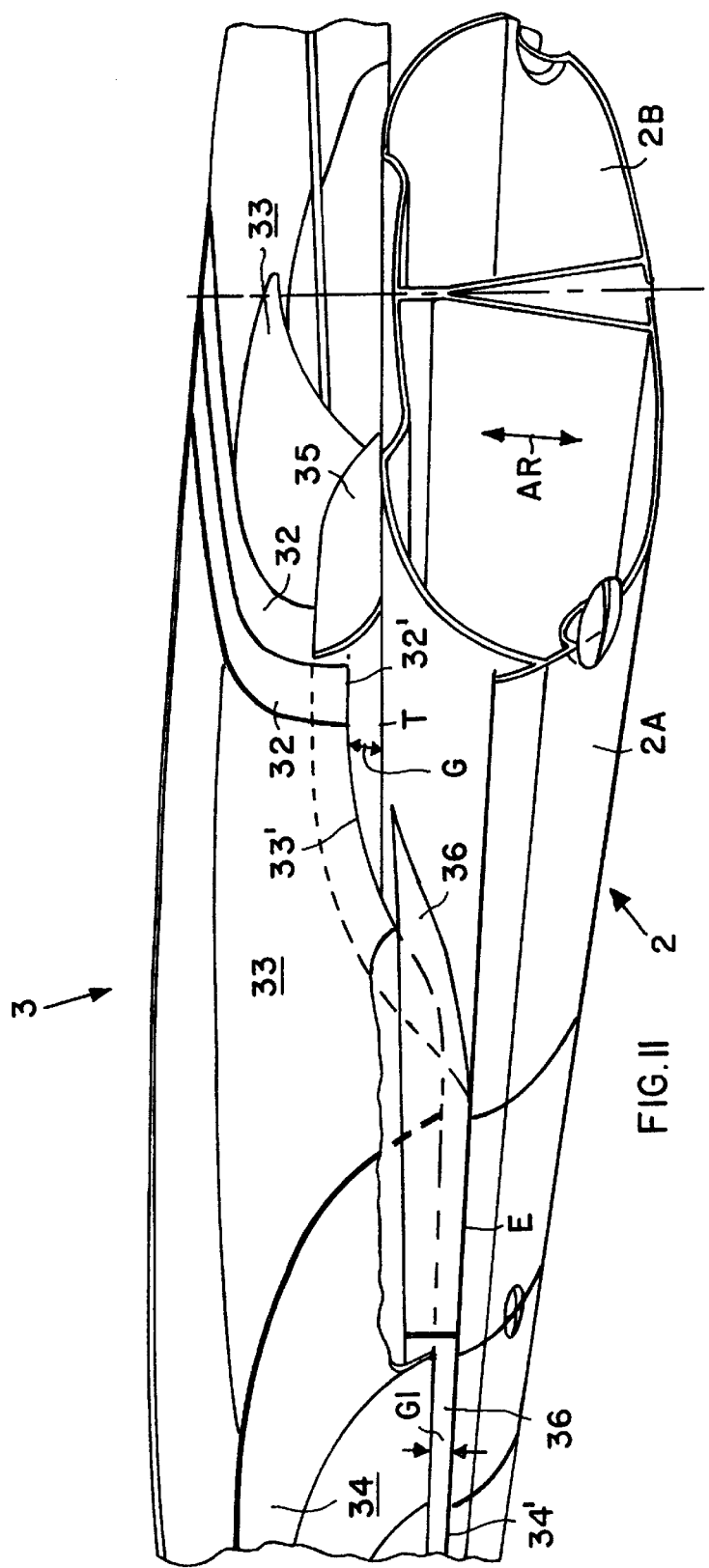
FIG. 11 is a partially broken away perspective view of central twin compartments with position adjustable ceiling panels for accommodating different elevational positions of the central twin compartments.

FIG. 11 shows the ceiling area above the twin central luggage storage compartments 2 and, broken away, the ceiling area above the left-hand aisle. As described above the freely suspended central bin system 2 can be raised or lowered as indicated by the double arrow AR, whereby a gap G is formed between lower edges 32' of central ceiling panels 32 and the top T of the central compartments 2. The gap G is also formed between the lower edge 33' of transition panels 33 and the top T. The size of the gap G depends on the elevational position of the compartments 2. A flexible molding 35 shown partly broken away in FIG. 11 to reveal the gap G covers this gap G. The molding 35 is secured to the top T of the compartments and is so dimensioned that the molding 35 will cover the gap G in any possible elevational position of the compartments 2. The panels 32 extend longitudinally between brackets 6 and downwardly in front of a bracket 6 and crossbeam 7 of the ceiling structure 3. The panels 33 form transition panels between the central panels 32 and panels 34 forming the ceiling above the left-hand aisle. Brackets 6 and crossbeams 7 are not visible in FIG. 11. The molding 35 extends crosswise to the longitudinal aircraft axis. A further molding 36 extending in parallel to the longitudinal axis of the aircraft covers a gap G1 between a lower edge 34' of the panels 34 and an aisle facing edge E of the compartments 2. The molding 36 may be secured or held by the edge E.

FIG. 12 is essentially a view similar to FIGS. 5 to 8 in the longitudinal aircraft axis facing toward the aircraft tail 1. However, FIG. 12 shows additionally the position of the molding 35 behind one of the covers 24 that enclose the brackets 6. FIG. 12 also shows that the molding 36 extends parallel to the longitudinal aircraft axis.

FIG. 13 is a view crosswise to the longitudinal aircraft axis. Gap G is covered by molding 35. Gap G1 is covered by molding 36.

FIG. 14 is a sectional view approximately along section line XIV—XIV in FIG. 3, "approximately" because the second mounting end wall 12' of a bin in front of the bracket 6 is not visible in FIG. 3. The bolt and nut connector BNC passes through the hole 8 in the bracket 6. The unthreaded central part of the bolt may be fixed in the hole 8. The threaded ends of the bolt pass, for example, through both holes 14C and 14C' of the mounting walls 12 and 12'. Washers W may be provided if desired. Other connections may be used, for example a headed bolt long enough to pass through all three holes and to hold a nut and possibly also a counter nut.

Referring again to FIG. 1, it is intended to place the columns and rows of holes 20 and 21 either in the end wall 19 or in struts or extensions of the bracket 18. For example, one column of holes could be positioned in a strut 18A of the bracket 18 and the other column of holes could be placed in a bracket extension such as shown at 14' in FIG. 3.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A variable position and modular luggage storage system for an aircraft passenger cabin enclosed by an aircraft body structure, said system comprising storage bins including mounting bin end walls, rigid mounting brackets attached to said aircraft body structure for suspending said storage bins, first securing elements forming part of said rigid mounting brackets for holding said storage bins in any one of a plurality of elevational positions while using the same said rigid mounting brackets, second securing elements forming part of said mounting end walls, for holding said storage bins in any one of said plurality of elevational positions while using the same said bin end walls, and at least two connector members for each bin end wall for holding said storage bins in any one of said plurality of elevational positions while using the same said connector members, each connector member linking at least one of said first securing elements with at least one of said second securing elements for mounting said storage bins in any one of said plurality of elevational positions relative to said rigid mounting brackets.

2. The system of claim 1, wherein said first securing elements comprise a horizontal row of holes in said rigid mounting brackets, wherein said second securing elements comprise at least two columns of holes in each of said mounting bin end walls, and wherein said connector members comprise threaded bolts and nuts, said threaded bolts fitting through any pair of axially aligned holes for an elevational positioning of said storage bins in any one of said plurality of elevational positions relative to said rigid mounting brackets.

3. The system of claim 1, wherein said first securing elements comprise at least two vertical columns of holes in said mounting brackets for each of said mounting bin end walls, and wherein said second securing elements comprise at least two horizontally aligned holes in each of said mounting bin end walls, and wherein said connector members comprise threaded bolts and nuts, said threaded bolts fitting through any pair of axially aligned holes for an elevational positioning of said storage bins in any one of said plurality of elevational positions relative to said rigid mounting brackets.

4. The system of claim 1, wherein said rigid mounting brackets comprise a central rigid carrier element, wherein said storage bins comprise central storage bins, said system further comprising a cover for said central rigid carrier element, said cover comprising an outer sleeve and an inner collar telescopable relative to said outer sleeve for accommodating an elevational repositioning of said central storage bins.

5. The system of claim 1, further comprising ceiling panels and a variable slidable overlap between neighboring ceiling panels for accommodating an elevational repositioning of said storage bins.

6. The system of claim 1, wherein said storage bins comprise a top and a molding attached to and extending along said top, whereby said molding is movable with said storage bins in an elevational repositioning of said storage bins, said system further comprising a ceiling panel having an edge overlapping with said molding for permitting said elevational repositioning of said storage bins.

7. The system of claim 1, further comprising ceiling panels having different contours, and a transition ceiling panel positioned between said ceiling panels of different contours for bridging an opening between said ceiling panels.

8. The system of claim 7, further comprising a transition molding positioned between said storage bins for covering a gap between said ceiling panels and a top of said storage bins in any elevational position of said storage bins.

9. The system of claim 8, wherein said transition molding is flexible and extends crosswise relative to a longitudinal central aircraft axis.

10. The system of claim 7, further comprising a longitudinal molding positioned for covering a gap between said storage bins and at least one of said ceiling panels having different contours.

11. The system of claim 1, wherein said storage bins are modular units which are exchangeable relative to each other.

12. The system of claim 1, wherein said storage bins are releasably fixed in any one of said plurality of elevational positions by said at least two connector members.

13. The system of claim 1, wherein said storage bins have different sizes and wherein each size is positionable in any one of said plurality of elevational positions.

14. The system of claim 1, further comprising a hinge for mounting said storage bins and for permitting tilting any one of said storage bins.

15. A variable position and modular luggage storage system for an aircraft passenger cabin enclosed by an aircraft body structure, said system comprising central storage bins including mounting end walls, rigid mounting brackets attached to said aircraft body structure for suspending said central storage bins, first securing elements forming part of said rigid mounting brackets, second securing elements forming part of said mounting end walls, and at least two connector members for each end wall, each connector member linking at least one of said first securing elements with at least one of said second securing elements for mounting said end walls in any one of a plurality of elevational positions relative to said rigid mounting brackets and wherein said rigid mounting brackets comprise a central rigid carrier element, said system further comprising a cover for said central rigid carrier element, said cover comprising an outer sleeve and an inner collar telescopable relative to said outer sleeve for accommodating an elevational repositioning of said central storage bins.

* * * * *